United States Patent
Vigna et al.

(10) Patent No.: US 6,396,174 B1
(45) Date of Patent: May 28, 2002

(54) METHOD FOR MANUFACTURING A MICROINTEGRATED STRUCTURE WITH BURIED CONNECTIONS, IN PARTICULAR AN INTEGRATED MICROACTUATOR FOR A HARD-DISK DRIVE UNIT

(75) Inventors: Benedetto Vigna, Pietrapertosa; Paolo Ferrari, Gallarate, both of (IT)

(73) Assignee: STMicroelectronics S.r.L., Agrate Brianza (IT)

( * ) Notice: Subject to any disclaimer, the term of this patent is extended or adjusted under 35 U.S.C. 154(b) by 0 days.

(21) Appl. No.: 09/523,571

(22) Filed: Mar. 10, 2000

(30) Foreign Application Priority Data

Mar. 22, 1999 (EP) ............................................ 99830158

(51) Int. Cl.[7] ....................... H01L 21/74; H01L 23/535; H02N 1/00
(52) U.S. Cl. ................................ 310/40 MM; 438/411; 438/723; 310/309
(58) Field of Search .......................... 310/40 MM, 309; 438/411, 723

(56) References Cited

U.S. PATENT DOCUMENTS

| | | | | |
|---|---|---|---|---|
| 4,937,202 A | * | 6/1990 | Maas ........................... | 438/271 |
| 5,493,156 A | * | 2/1996 | Okada .................... | 310/40 MM |
| 5,992,236 A | * | 11/1999 | White et al. .................. | 73/622 |
| 6,180,478 B1 | * | 1/2001 | Lee et al. .................... | 438/309 |
| 6,197,655 B1 | * | 3/2001 | Montanini et al. ........... | 438/411 |
| 6,209,394 B1 | * | 4/2001 | Ferrari et al. ............ | 73/504.14 |
| 6,329,737 B1 | * | 12/2001 | Jerman et al. ............... | 310/309 |

OTHER PUBLICATIONS

Gates, H.R., "Buried Resistor Structure," *IBM Technical Disclosure Bulletin*, vol. 12, No., 12, May 1970, p. 2061.
Gennissen et al., "Thick Polysilicon Microstructures By Combination Of Epitaxial And Poly Growth In A Single Deposition Step," *Proceeding of the 1996 National Sensor Conference, Delft*, Mar. 20–12, 1996, pp. 189–192.
Fan and Woodman, "Batch Fabrication of Mechanical Platforms for High Density," *IBM Research Division*. (date unknown).

* cited by examiner

*Primary Examiner*—Nestor Ramirez
*Assistant Examiner*—Judson H. Jones
(74) *Attorney, Agent, or Firm*—Lisa K. Jorgenson; Robert Iannucci; Seed IP Law Group, PLLC

(57) ABSTRACT

The method is intended for manufacturing a microintegrated structure, typically a microactuator for a hard-disk drive unit and includes the steps of: forming interconnection regions in a substrate of semiconductor material; forming a monocrystalline epitaxial region; forming lower sinker regions in the monocrystalline epitaxial region and in direct contact with the interconnection regions; forming insulating material regions on a structure portion of the monocrystalline epitaxial region; growing a pseudo-epitaxial region formed by a polycrystalline portion above the structure portion of the monocrystalline epitaxial region and elsewhere a monocrystalline portion; and forming upper sinker regions in the polycrystalline portion of the pseudo-epitaxial region and in direct contact with the lower sinker regions. In this way no PN junctions are present inside the polycrystalline portion of the pseudo-epitaxial region and the structure has a high breakdown voltage.

13 Claims, 5 Drawing Sheets

METHOD FOR MANUFACTURING A MICROINTEGRATED STRUCTURE WITH BURIED CONNECTIONS, IN PARTICULAR AN INTEGRATED MICROACTUATOR FOR A HARD-DISK DRIVE UNIT

TECHNICAL FIELD

The present invention relates to a method for manufacturing a microintegrated structure with buried connections, in particular an integrated microactuator for a hard disk drive unit.

BACKGROUND OF THE INVENTION

As known, hard disks are the most widely used medium for storing data in personal computers; consequently, they are produced in very large quantities and the maximum data storage capacity increases year by year. Hard disks are read and written by a drive unit, the general structure whereof is shown in FIGS. 1 and 2 and is described hereinbelow.

In particular, FIG. 1 shows a drive unit 1 of rotary type comprising a motor 2 (also called "voice coil motor") fixed to a support body 3 usually called E-block owing to its E-shape when viewed laterally (see FIG. 2). The support body 3 has a plurality of arms 4, each carrying a suspension 5 formed by a steel blade fixed in cantilever fashion. Each suspension 5 has, at its end not fixed to the support body 3, a joining piece, called gimbal or flexure 8, also made of steel and carrying a read/write transducer also called slider 6 and arranged (in the operative condition) facing a surface of a hard disk 7.

The slider 6 is formed by a support body bearing, fixed thereto, a magneto/resistive and inductive R/W head 9 forming the actual read/write device; electric wires (not shown) extend from the R/W head 9 along the flexure 8 and the suspension 5 as far as a signal processing device (also not shown) fixed to the mother board of the personal computer or other apparatus comprising data storage hard disks.

In the read/write devices for hard disks currently commercially available, the slider 6 is glued directly to the flexure 8. To obtain a more precise and fine control of the position of the slider 6, it has already been proposed to use a double actuation stage, with a first courser actuation stage, comprising the motor 2 displacing the assembly formed by support body 3, suspension 5, flexure 8 and slider 6 across the hard disk 7 when carrying out an approximate track search, and a second actuation stage, comprising an integrated microactuator 10 arranged between the slider 6 and the flexure 8 and performing finer control of the position of the slider 6 when searching for a track.

Different technologies have been proposed for manufacturing the integrated microactuator, such as surface micromachining, which use polycrystalline surface layers of semiconductor material deposited over a semiconductor material wafer, electrogalvanic growth, or ad hoc processes other than those normally used in microelectronics.

The proposed methods using the technique of surface micromachining have the drawback that they do not allow integration of the microactuator with the control and drive circuits or involve low-output and very costly post-machining steps.

Other known solutions involve the use of ductile materials such as nickel or its alloys. However, these solutions are also not free from drawbacks. Although nickel can dissipate internally the mechanical energy, its plastic behavior makes final quality control of the end device particularly expensive and difficult.

European patent application No. 97830537.3, dated Oct. 29, 1997 and owned by STMicroelectronics, S.r.l., describes a method for manufacturing an integrated microactuator formed in the epitaxial layer of a semiconductor material wafer. In particular, according to the solution described in this patent application, buried interconnection regions are formed in a monocrystalline silicon substrate, and then a sacrificial region and isolating regions, comprising silicon oxide, are formed on the substrate surface; a polycrystalline silicon seed layer is then deposited on the substrate and the silicon oxide regions and then an epitaxial layer is grown, which is polycrystalline above the silicon oxide regions and elsewhere monocrystalline; the electronic components of the circuitry are then formed within and above the monocrystalline portion of the epitaxial layer, while the conductive regions necessary for forming the microactuator are formed in the polycrystalline portion; then the epitaxial layer is etched to define and separate from one another a rotor and a stator; finally, the sacrificial region is removed to free the movable structures from the rest of the wafer.

This solution, although very advantageous as regards the mechanical characteristics, owing to the reduced risk of sticking of the movable structures and the lower manufacturing costs compared to other known solutions, has the problem that PN junctions are present between the buried N-type connection regions, necessary for biasing the various regions of the actuator, and the P-type seed layer necessary for epitaxial growth in the mutually facing zones. These PN junctions have low and in particular non-controllable breakdown voltages that limit the applicable operative biasing voltages of the microactuator.

SUMMARY OF THE INVENTION

An embodiment of the invention overcomes the drawback associated with the preceding solution, increasing the usable biasing voltage values.

An embodiment is directed to a method for manufacturing a microintegrated structure, typically a microactuator for a hard-disk drive unit and includes the steps of: forming interconnection regions in a substrate of semiconductor material; forming a monocrystalline epitaxial region; forming lower sinker regions in the monocrystalline epitaxial region and in direct contact with the interconnection regions; forming insulating material regions on a structure portion of the monocrystalline epitaxial region; growing a pseudo-epitaxial region formed by a polycrystalline portion above the structure portion of the monocrystalline epitaxial region and elsewhere a monocrystalline portion; and forming upper sinker regions in the polycrystalline portion of the pseudo-epitaxial region and in direct contact with the lower sinker regions. In this way no PN junctions are present inside the polycrystalline portion of the pseudo-epitaxial region and the structure has a high breakdown voltage.

BRIEF DESCRIPTION OF THE DRAWINGS

In order to illustrate the present invention, a preferred embodiment thereof is now described, purely by way of a non-limiting example, with reference to the accompanying drawings, wherein.

DETAILED DESCRIPTION OF THE INVENTION

Figure 1:
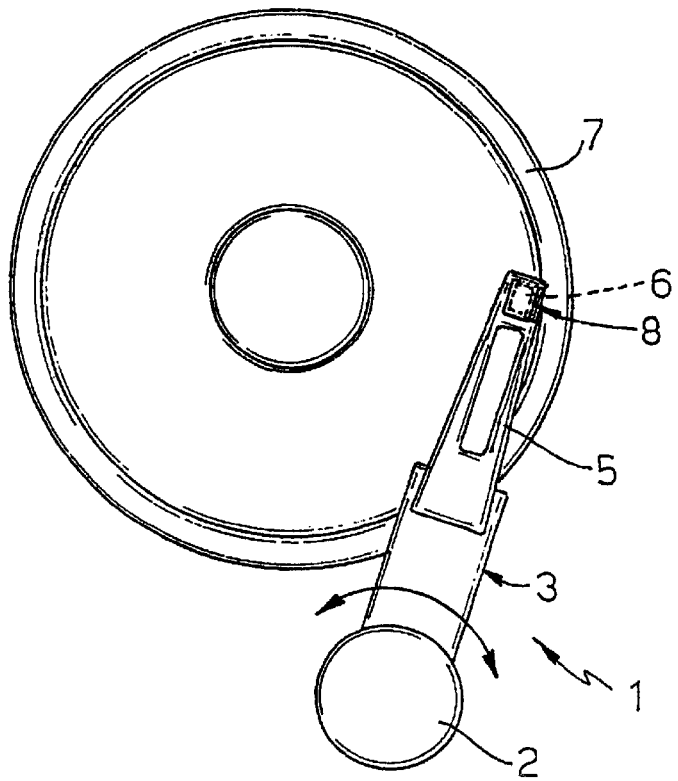
FIG. 1 shows a plan view of a drive unit for hard disks, of known type.
Figure 2:
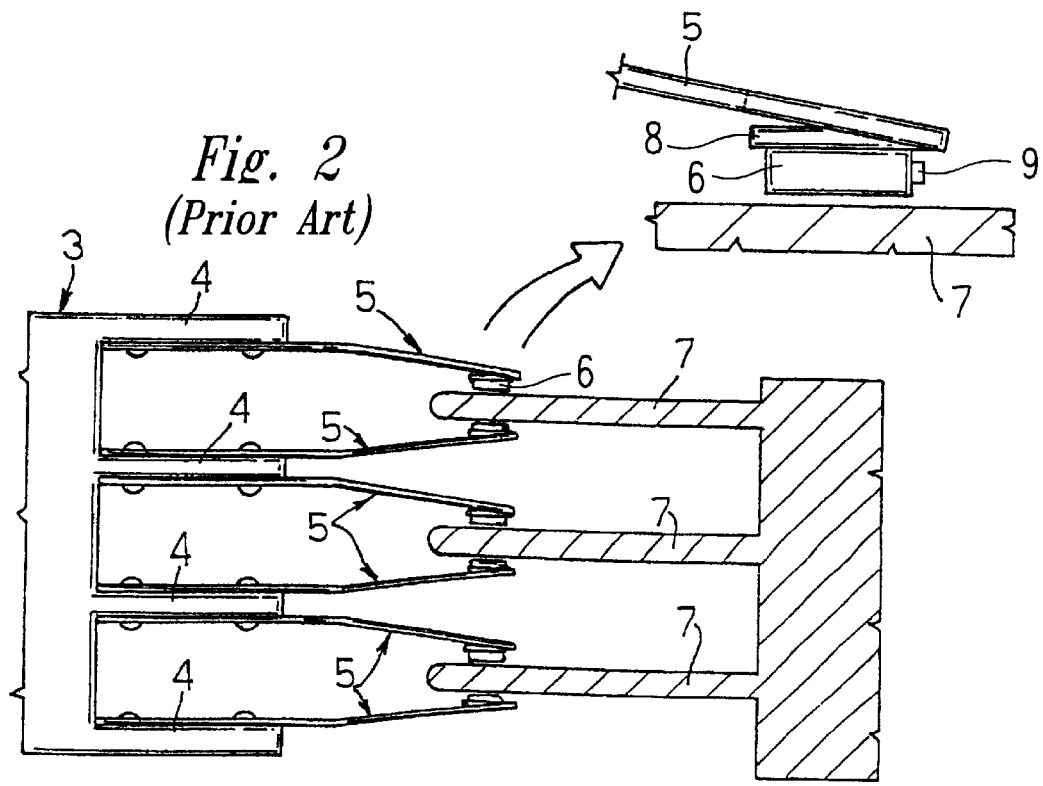
FIG. 2 shows a partially broken side view, on a larger scale, of the drive unit according to FIG. 1.
Figure 3:
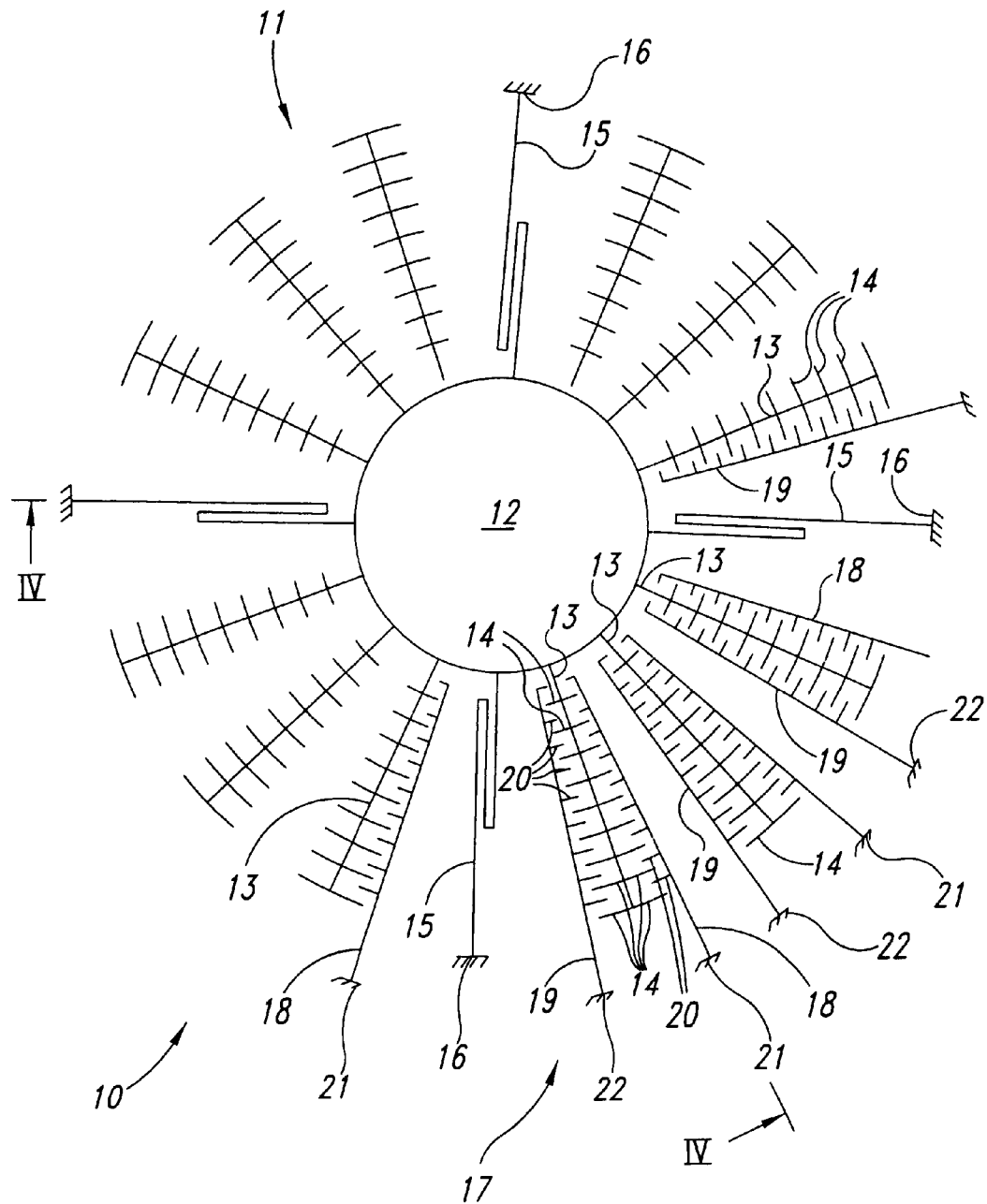
FIG. 3 shows a diagrammatic view of a microactuator of known type, which can be manufactured using the present method.

FIG. 3 shows a microactuator 10 of rotary electrostatic type usable in a hard disk drive unit (not shown), only part whereof is shown in its entirety in view of its axial symmetry.

The microactuator 10 comprises a stator 17 and a rotor 11 capacitively coupled to the stator 17.

The rotor 11 comprises a suspended mass 12 having a substantially circular shape and a plurality of movable arms 13 extending radially outwards from the suspended mass 12. Each movable arm 13 carries a plurality of movable electrodes 14 extending in a substantially circumferential direction and equidistant from each other. The rotor 11 also comprises resilient suspension and anchoring elements (springs 15) for supporting and biasing the rotor 11 through fixed biasing regions 16.

The stator 17 comprises a plurality of fixed arms 18, 19 extending radially and each carrying a plurality of fixed electrodes 20; in particular, each movable arm 13 has, associated thereto, a pair of fixed arms formed by a fixed arm 18 and a fixed arm 19; the fixed electrodes 20 of each pair of fixed arms 18, 19 extend towards the associated movable arm 13 and are arranged or interdigitated between the movable electrodes 14. The fixed arms 18 are all arranged on the same side of the respective movable arms 13 (for example on the right-hand side) and are all biased at the same potential by biasing regions 21; similarly, the fixed arms 19 are all arranged on the other side of the respective movable arms 13 (for example on the left-hand side) and are all biased at the same potential by biasing regions 22.

The fixed arms 18 and 19 are biased at different potentials to generate two potential differences with respect to the movable arms 13 and cause rotation of the rotor 11 in either direction.

The method for manufacturing the microactuator 10 will now be described with reference to FIGS. 4 to 10, taken along a broken line IV—IV of FIG. 3, to show the buried contact of the springs 15 and the fixed arms 18. The fixed arms 19 are connected in a manner similar to the fixed arms 18.

Figure 4:
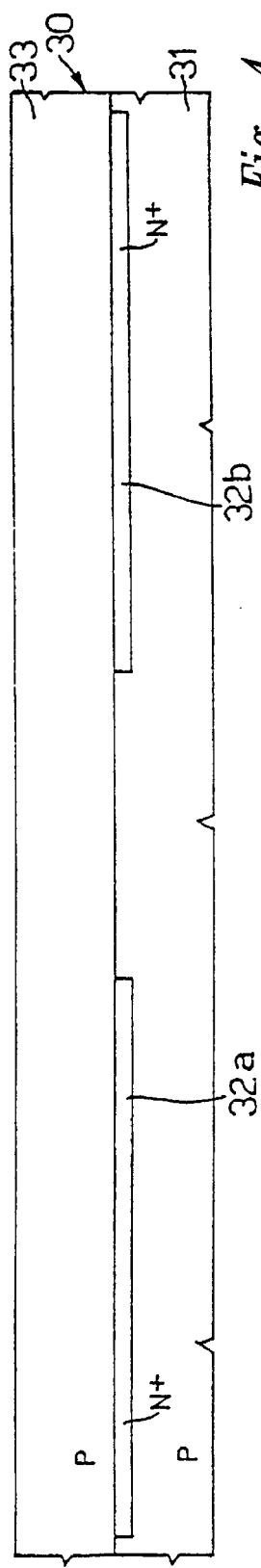
FIGS. 4 to 10 show cross-sections through a semiconductor material wafer, taken along line IV—IV of FIG. 3, during different steps of the present method.

In detail, starting from a wafer 30 formed by a monocrystalline substrate 31 of P-type semiconductor material (silicon), initially a phototechnical masking and selective implantation step of antimony ions for forming N-type buried connection regions is performed. In particular, FIG. 4 shows a buried connection region 32a for electrically connecting a spring (15 in FIG. 3) and buried connection region 32b for electrically connecting a fixed arm (18 in FIG. 3). A first epitaxial growth, resulting in the formation of a P-type monocrystalline epitaxial region 33, preferably with a thickness of 10 microns and resistivity of 15 Ohm/cm, is then performed. The structure according to FIG. 4 is thus obtained.

Figure 5:
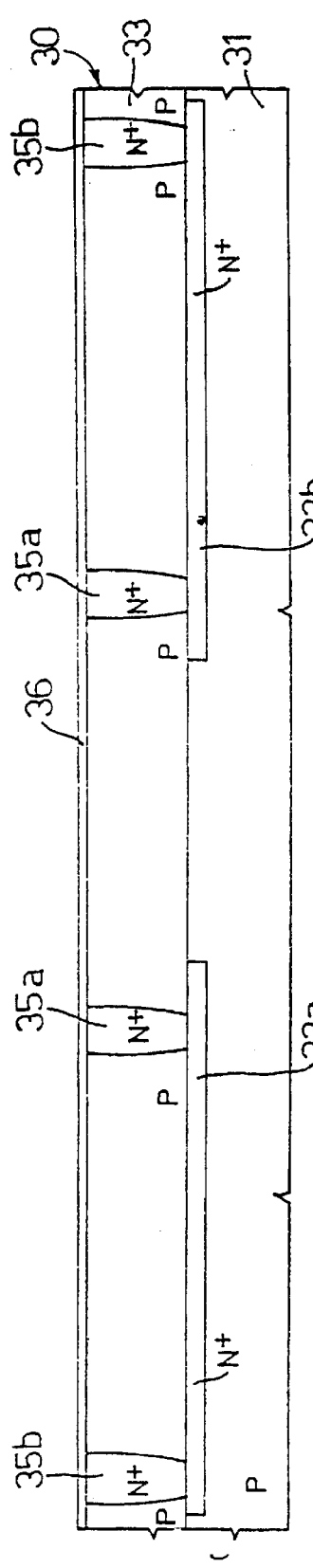

The surface of the monocrystalline epitaxial region 33 is then oxidized so as to form a pad oxide layer 36 with a thickness of about 500 nm; then a masked selective implantation and subsequent diffusion of $POCl_3$ is carried out to form N-type lower sinker regions extending over the entire thickness of the monocrystalline epitaxial region 33 and in direct contact with the ends of the buried connection regions 32a, 32b. The structure according to FIG. 5 is therefore obtained, the lower sinker regions being shown at 35a and 35b, respectively, near the radially internal and external ends of the buried connection regions 32a, 32b.

Figure 6:
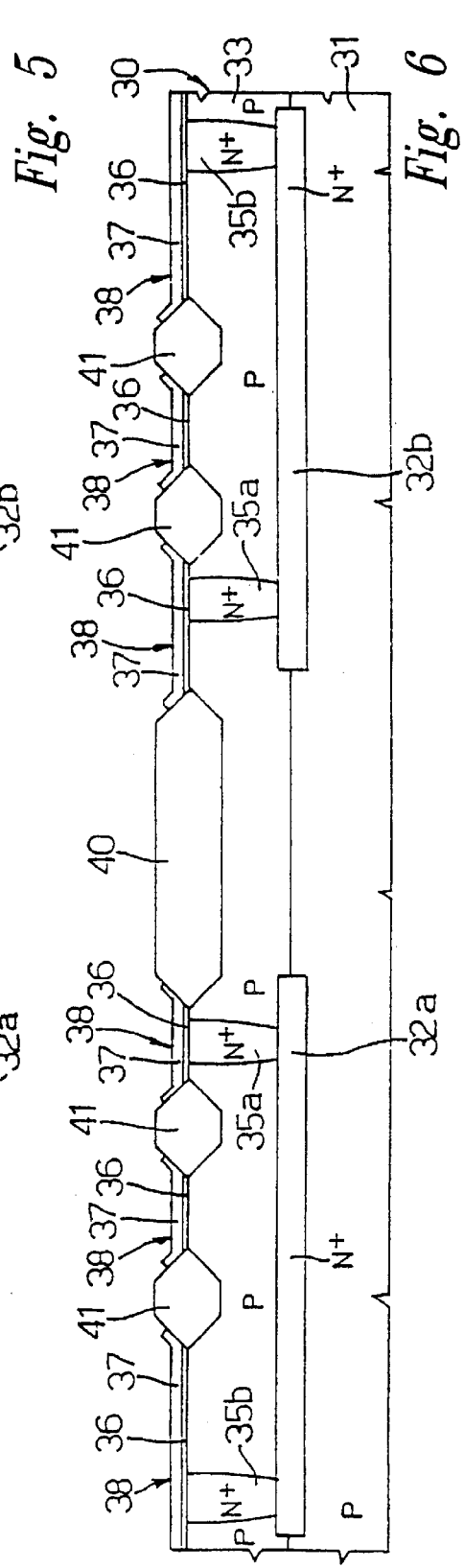

A silicon nitride layer 37 is then deposited onto the pad oxide layer 36. The silicon nitride layer 37 is then defined and selectively removed to obtain protective regions, indicated at 38, selectively covering the surface of the monocrystalline epitaxial region 33. Thereafter, the portions of the surface of the monocrystalline epitaxial region not covered by the protective regions 36, 37 are oxidized locally and form oxide regions comprising a sacrificial region 40 and buried oxide regions 41 with a thickness, for example, of 2 $\mu$m. The structure according to FIG. 6 is thus obtained.

Figure 7:
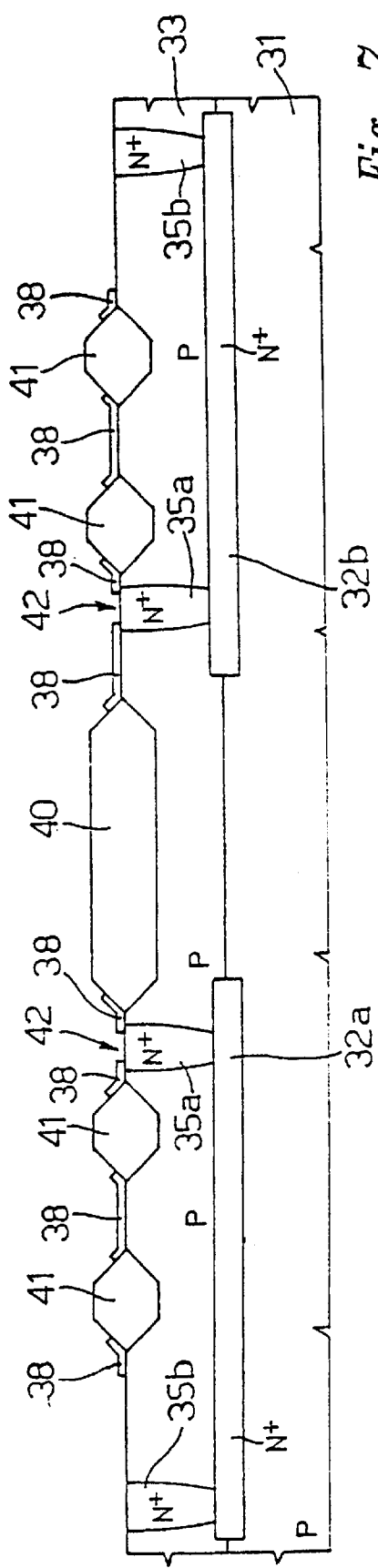

Then, through a suitable masking step, the portions of the protective regions 38 intended to form the contacts with the buried interconnection regions 32a, 32b and the portions of the protective regions 38 arranged outside the actuator region (right-hand and left-hand end in FIG. 7) are removed. In particular, the protective regions 38 are removed below the circuitry zone (not shown). Openings 42 are formed between the sacrificial oxide region 40 and the buried oxide regions 41 closest thereto (in the radially internal lower sinker regions 35a). Therefore the structure of FIG. 7 is obtained, wherein, for simplicity, the pad oxide layer 36 below the silicon nitride layer 37 has not been shown.

Figure 8:
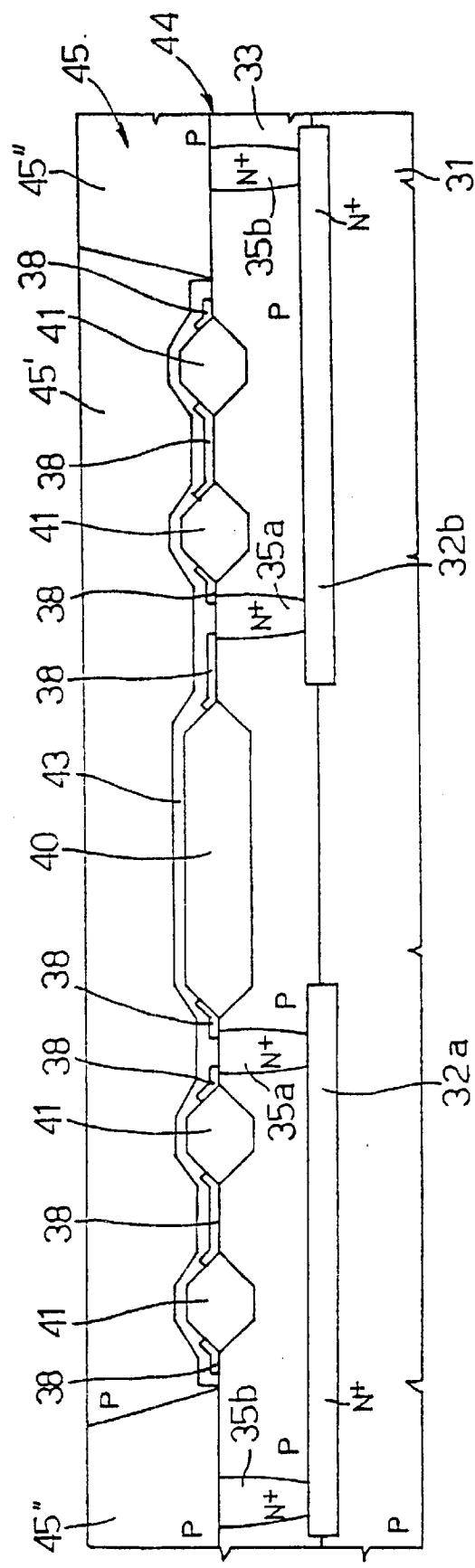

A polycrystalline or amorphous silicon layer with a thickness, for example, of 300–4000 nm is then deposited; by a plasma phototechnical etching step, the polycrystalline or amorphous silicon layer is then removed outside the zone intended to house the actuator 10, forming a seed region 43 (FIG. 8). Then, a second epitaxial growth is performed, forming a P-type pseudo-epitaxial layer 45 with a thickness for example of 10–30 $\mu$m. The pseudo-epitaxial layer 45 has a polycrystalline structure (polycrystalline portion 45') above the seed region and, elsewhere, a monocrystalline structure (monocrystalline portion 45"). A wafer 44 shown in FIG. 8 is thus obtained.

Figure 9:
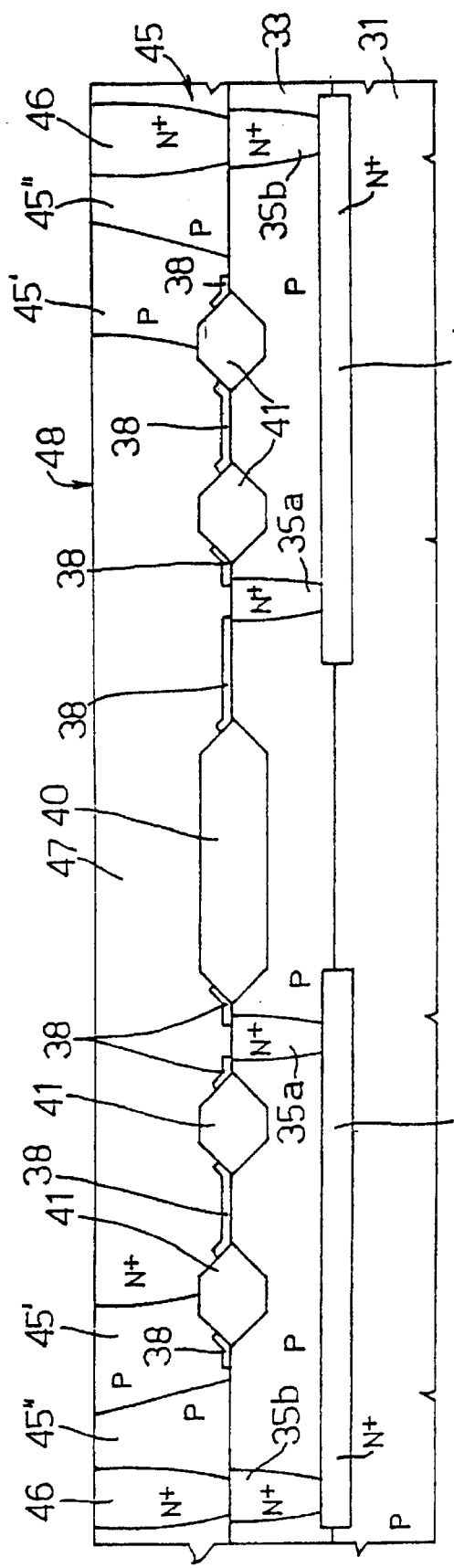

Thereafter, the pseudo-epitaxial layer 45 is doped with doping ions suitable for giving an N-type conductivity for forming sinker regions; in particular, according to FIG. 9, upper sinker regions 46 are formed in the monocrystalline portion 45", above and aligned with the radially external lower sinker regions 35b, over the whole thickness of the pseudo-epitaxial layer 45. Moreover, a pocket 47 intended to form the suspended mass 12, the movable and fixed arms 13, 18 and 19, the springs 15, the fixed regions 21, 22 and 16 is formed in the polycrystalline portion 45', the pocket also extending from the surface 48 of the pseudo-epitaxial layer 45 as far as the monocrystalline epitaxial region 33.

Thereafter, carrying out standard steps not shown, electronic components of the circuitry are formed inside and above the monocrystalline portion 45", as well as one or more protective layers, metal contact regions and a passivation layer are formed above the surface 48.

Subsequently, using a suitable resist or deposited oxide mask, the monocrystalline epitaxial region 33 is etched, forming a trench 50 separating the suspended mass 12, the movable arms 13 and the anchoring elements 15 from the fixed arms 18, 19 as well as the biasing regions 16, 21, 22 from each other.

Figure 10:
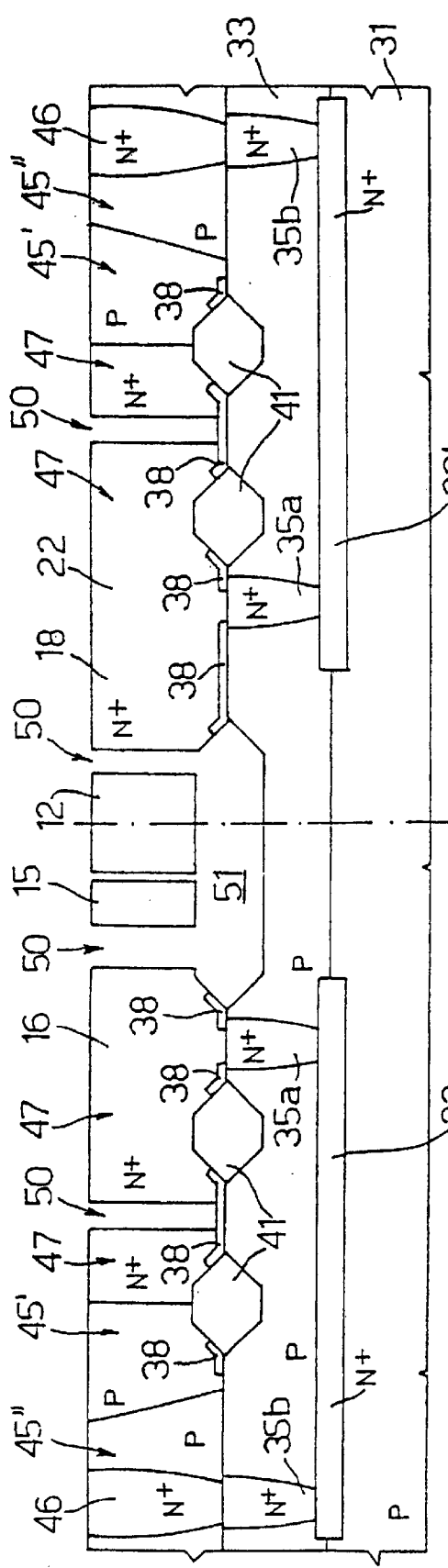

Finally, via the trench 50, the sacrificial region 40 is removed by etching in hydrofluoric acid to form an air gap 51 and to free the movable arms 13 and the movable and fixed electrodes 14, 20. The final structure shown in FIG. 10 is thus obtained.

The advantages of the described manufacturing method include the following. Owing to the two-stage formation of the epitaxial layer, the buried interconnection regions 32a, 32b are surrounded only by monocrystalline silicon regions 31, 33 (buried regions in the bulk); in particular, there is no longer contact between the buried interconnection regions 32a, 32b and the P-type polycrystalline seed region 43;

consequently there are no longer PN junctions inside the polycrystalline portion 45', except the border of the pocket 47 where, however, no active structures are present and no high voltages are applied. The structure is therefore able to withstand high voltages (80–100 V) necessary in the case where large displacements (up to 10 μm) must be obtained and/or high masses (up to a few milligrams) must be provided.

The thus obtained structure may be completely integrated with the present electronic circuits, in particular with the associated drive and control circuit; moreover, since it is made of semiconductor silicon, it is not fragile and is suitable for manufacturing drive units for hard disks.

Finally, many modifications and variations may be made to the method described and illustrated herein, all that fall within the scope of the invention, as defined in the accompanying claims. In particular, it is emphasized that the described solution is applicable not only to the manufacture of microactuators for hard disk drive circuits, but also to sensors, electromechanical and opto-electromechanical components, and in general to all microstructures based on semiconductor technology to which high voltages ($\geq 40$ V) must be applied.

What is claimed is:

1. A microintegrated structure of semiconductor material, comprising:

a semiconductor material body with a monocrystalline structure;

a semiconductor layer with a mixed structure, including a polycrystalline portion and a monocrystalline portion;

insulating material regions between said semiconductor material body and said polycrystalline portion of said semiconductor layer;

buried interconnection regions extending inside and completely surrounded by said semiconductor material body; and buried sinker regions that include lower sinker regions extending in said semiconductor material body from said semiconductor layer to said buried interconnection regions, in direct contact with said buried interconnection regions; and upper sinker regions extending in said semiconductor layer and in direct contact with said lower sinker regions.

2. A structure according to claim 1 wherein said semiconductor material body and said monocrystalline portion of said semiconductor layer have a first conductivity type and said buried interconnection regions, said lower sinker regions and said upper sinker regions have a second conductivity type.

3. A structure according to claim 2 wherein said lower sinker regions comprise first regions in contact with a first end of each said interconnection region and second regions in contact with a second end of respective buried interconnection regions; and said upper sinker regions comprise third regions substantially aligned with said second regions and a pocket region, said pocket region extending in said polycrystalline portion of said semiconductor layer and having portions in direct electrical contact with said first regions.

4. A structure according to claim 1 wherein said structure is a microactuator comprising a rotor and a stator; said rotor comprising a suspended mass connected, by suspension elements, to anchoring and biasing portions formed in said polycrystalline portion of said semiconductor layer and connected to respective buried interconnection regions through respective lower sinker portions; said polycrystalline portion of said semiconductor layer also housing fixed biasing regions connected to fixed electrodes of said stator and, through respective lower sinker regions, to respective buried interconnection regions.

5. A structure according to claim 4 wherein said microactuator is part of a hard disk drive unit with two-stage micrometric actuation.

6. A microintegrated structure of semiconductor material, comprising:

a semiconductor material body with a monocrystalline structure;

a semiconductor layer positioned on the semiconductor material body;

a buried interconnection region enclosed within the semiconductor material body;

a first lower sinker region extending through the semiconductor material body into direct contact with the buried interconnection region; and an upper sinker region extending through the semiconductor layer and in direct contact with the first lower sinker region.

7. The structure of claim 6 wherein the semiconductor layer includes a monocrystalline region and a polycrystalline region and the upper sinker extends through the monocrystalline region.

8. The structure of claim 7 wherein the semiconductor material body and the monocrystalline region have a first conductivity type and the buried interconnection region, first lower sinker region, and upper sinker region have a second conductivity type.

9. The structure of claim 6 wherein the first lower sinker region is in contact with a first end of the interconnection region, the structure further comprising a second lower sinker region in contact with a second end of the buried interconnection region; and a pocket region extending through the semiconductor layer and in direct electrical contact with the second lower sinker region.

10. The structure of claim 6, further comprising insulating material regions between the semiconductor material body and the semiconductor layer.

11. The structure of claim 6 wherein the structure is a microactuator and the semiconductor layer includes an anchoring portion, the structure further comprising:

a second lower sinker portion in contact with the buried interconnection region;

a rotor that includes a suspended mass connected to the buried interconnection region through the second lower sinker portion;

suspension elements that connect the suspended mass to the anchoring portion of the semiconductor layer; and a stator fixed to the semiconductor layer.

12. The structure of claim 6 wherein the buried interconnection region is a first buried interconnection region and the structure further comprises:

a second buried interconnection region buried in the semiconductor material body;

a second lower sinker region in contact with the second buried interconnection region; and fixed biasing regions housed in the semiconductor layer and connected to fixed electrodes of the stator and, through the second lower sinker region, to the second buried interconnection regions.

13. The structure of claim 12 wherein the microactuator is part of a hard disk drive unit with two-stage micrometric actuation.

* * * * *

UNITED STATES PATENT AND TRADEMARK OFFICE
CERTIFICATE OF CORRECTION

PATENT NO. : 6,396,174 B1
DATED : May 28, 2002
INVENTOR(S) : Benedetto Vigna et al.

It is certified that error appears in the above-identified patent and that said Letters Patent is hereby corrected as shown below:

Column 6,
Line 63, "The structure of claim 12" should read -- The structure of claim 11 --.

Signed and Sealed this

Fifteenth Day of October, 2002

Attest:

Attesting Officer

JAMES E. ROGAN
Director of the United States Patent and Trademark Office